United States Patent [19]

Flachbarth et al.

[11] 4,443,654
[45] Apr. 17, 1984

[54] FLUSH FLOOR FITTING

[75] Inventors: Charles T. Flachbarth, Parkersburg; Richard D. Benscoter, Vienna; James E. Sheridan, Williamstown, all of W. Va.

[73] Assignee: Butler Manufacturing Company, Kansas City, Mo.

[21] Appl. No.: 312,649

[22] Filed: Oct. 19, 1981

[51] Int. Cl.³ .............................................. H02G 3/14
[52] U.S. Cl. ...................................... 174/48; 174/57; 174/67
[58] Field of Search ...................... 174/48, 49, 57, 67; 52/221; 220/3.7

[56] References Cited

U.S. PATENT DOCUMENTS

| 3,199,713 | 8/1965 | Flachbarth | 220/3.7 |
| 3,318,476 | 5/1967 | Clark | 174/48 X |
| 3,322,442 | 5/1967 | Flachbarth | 52/221 X |
| 3,592,956 | 7/1971 | Fork | 174/49 |
| 3,701,837 | 10/1972 | Fork | 174/49 X |
| 3,932,696 | 1/1976 | Fork et al. | 174/48 |
| 4,041,238 | 8/1977 | Penczak | 174/48 |
| 4,289,921 | 9/1981 | Gartner et al. | 174/48 |

Primary Examiner—A. T. Grimley
Assistant Examiner—D. A. Tone
Attorney, Agent, or Firm—Frederick J. Olsson

[57] ABSTRACT

Fitting comprises an attaching ring secured to a pair of adjacent underfloor ducts and spanning the prepunched access holes in the ducts, the attaching ring retains adjusting screws which in turn support an adjustable carpet plate which carries power/telephone outlets.

7 Claims, 12 Drawing Figures

FLUSH FLOOR FITTING

This invention relates in general to electrical underfloor systems and in particular relates to a flush floor outlet fitting providing for service at the floor level, the service being power or telephone or both.

In one aspect the invention contemplates a flush floor fitting having uniquely designed components which cooperate in providing for the vertical height of the fitting to be minimal to thereby adapt the fitting for use with minimum thickness concrete floors but which can be easily and simply converted for use with floors of maximum thickness.

In another aspect the invention contemplates a flush floor fitting to provide power and telephone/power service at the floor level which is structured to be placed in a not-in-use or an abandoned status by simple straight forward action of office personnel and without the necessity of disconnecting wires, etc. requiring the use of an electrician.

In another aspect the invention contemplates a flush floor fitting adaptable for dual and single service and having a cover plate arrangement which will protect the fitting when service is temporarily discontinued to the particular floor area.

In another aspect the invention contemplates a flush floor fitting for dual and single service having an attaching ring to span pre-punched access holes in adjacent ducts which provides or use of the fitting with a pair of No. 2 power ducts, a pair of No. 4 telephone ducts, and a conventional arrangement comprising a No. 2 power duct and a No. 4 telephone duct.

In another aspect the invention contemplates a flush floor fitting to provide power and/or telephone outlets structured so that the components recessed in the floor to provide power and telephone outlets and which are viewable when the fitting is in use are not installed until after the floor is poured and hardened to thereby save these components from construction damage.

In another aspect the invention contemplates a flush floor fitting to provide power and/or telephone outlets structured so that the components which are recessed in the floor to provide power and/or telephone outlets and which are viewable when the fitting is in use are not installed until after the floor is poured and hardened and which, at that time, are conveniently leveled to make the fitting flush with the floor surface.

In another aspect the invention contemplates flush floor fitting having an attaching ring to span and communicate with the pre-punched access holes in adjacent ducts, the ring including improved means which is employed in quickly securing the ring to the ducts prior to the pour and which is also employed after the pour for securing the fitting components and for the leveling of the same.

In another aspect the invention contemplates a flush floor fitting having an attaching ring to span and communicate with the pre-punched access holes in the ducts, the ring being adapted to carry a mud pan for use during the pour, during the time the floor area is inactive, and also adapted to accept and support adjusting screws to mount and level the fitting.

In another aspect the invention contemplates a dual service flush floor fitting having an attaching ring to span and communicate with the duct access holes, during the pour the ring being secured to the ducts and carrying a mud cap and the ring and cap forming the necessary spaces for securing the power/telephone outlets when the area is activated, and the ring also being adapted after the pour to remain connected to the ducts and to mount adjusting screws by which an adjustable carpet plate (which carries the outlets) is secured and leveled.

The invention will be described in connection with the following drawings therein:

FIG. 1 is an exploded view of the various components of the fitting disposed over a pair of underfloor ducts one being a No. 2 power duct and the other being a No. 4 telephone duct;

FIG. 1-A is an enlarged fragmentary plan view of the means employed to secure the fitting to the ducts;

FIG. 1-B is an enlarged fragmentary plan view of the means employed for leveling the fitting with the floor surface;

FIG. 5 is an exploded perspective view illustrating the structure of a telephone access plate of the kind illustrated in FIG. 1;

FIG. 6 is a perspective view illustrating the structure of a flip-cap power access plate of the kind as indicated in FIG. 1;

FIG. 6-A is a view taken along the lines 6-A—6-A of FIG. 6;

FIG. 6-B is a sectional view taken along the lines 6-B—6-B of FIG. 6;

FIG. 7 is an exploded view of a not-in-use power access plate;

FIG. 8 is an exploded view of a modified not-in-use power access plate.

Figures 1, 1A, 1B:
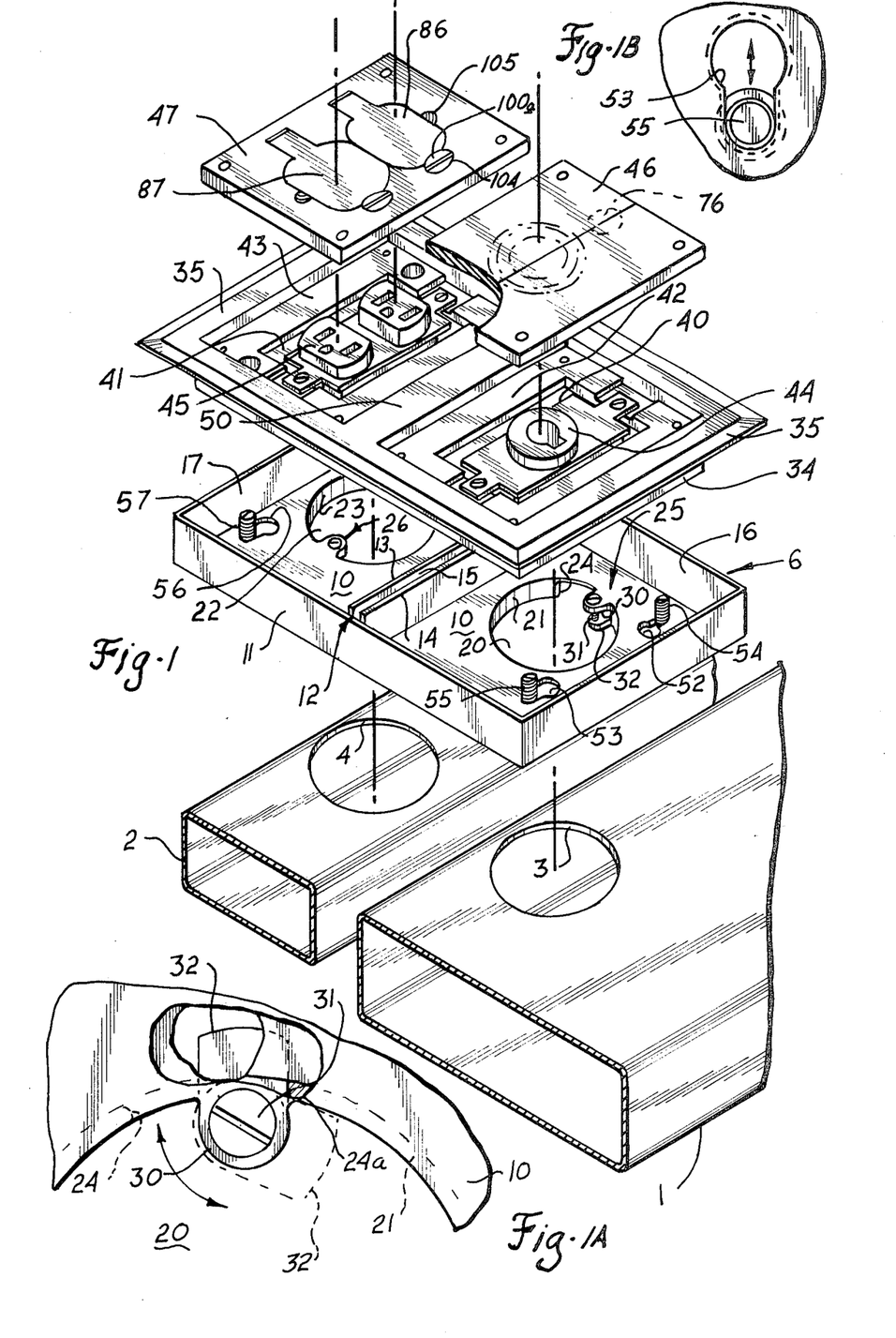
Figure 2:
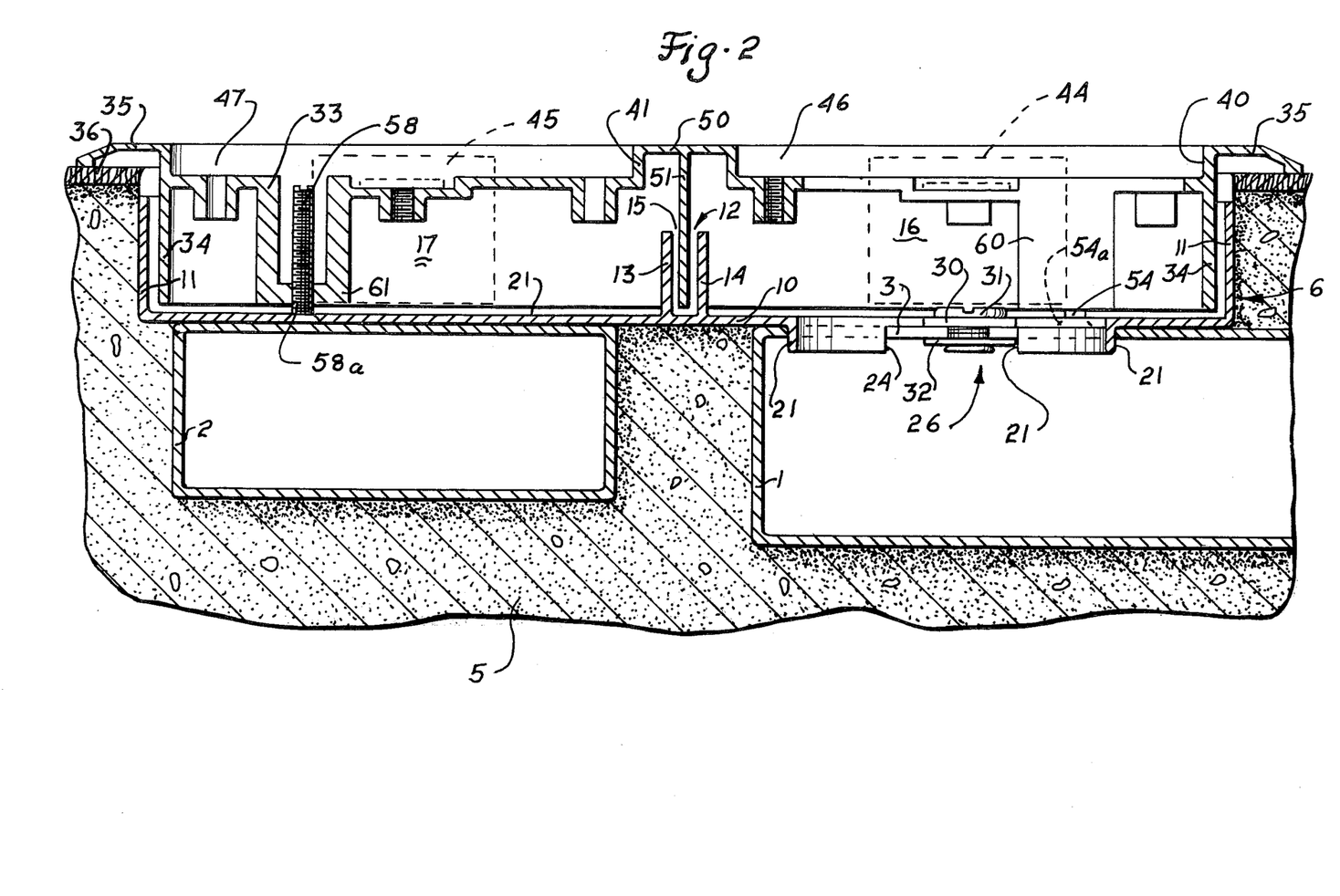
FIG. 2 is a sectional elevational view of the components of FIG. 1 connected together and mounted in a concrete floor.

Referring to FIGS. 1 and 2, a No. 4 telephone duct 1 is disposed in parallel relationship with a No. 2 power duct 2. The top of the telephone duct 1 has an access hole 3 and the top of the power duct 2 has an access hole 4. The access holes occupy a side-by-side relationship. As is conventional in underfloor systems, the ducts are adapted to be buried in concrete floor 5 with a duct 1 carrying telephone conductors and a duct 2 carrying power conductors, although both ducts can carry the same service. The access holes provide passageways for getting the conductors in and out of the ducts.

The flush fitting of the invention is attached to the ducts as explained following.

An attaching ring 6 is generally rectangular in shape and is elongated so as to extend across or span the ducts 1 and 2. The attaching ring 6 has a bottom wall 10, side walls 11 on the periphery of the bottom wall 10 and extending upwardly therefrom together with an intermediate wall 12 comprised of the spaced uprights 13 and 14 which form a channel 15. The bottom wall 10, side walls 11, and the intermediate wall 12 form a telephone compartment 16 and a power compartment 17.

The compartments 16 and 17 each have an aperture for the passageway of cables between the compartment and the duct underneath the same. The aperture for the telephone compartment 16 is indicated at 20 and is formed by the circular wall 21 extending down from the bottom wall 10. When the attaching ring 6 is mounted on the ducts (FIG. 2) the circular wall 21 extends through the access hole 3 and then into the telephone duct 1. The bottom edge of the circular wall 21 is rounded for conductor pulling purposes.

The aperture for the power compartment 17 is indicated at 22 and is formed by the circular wall 23 extending down from the bottom wall 10. When installed in the ducts the circular wall 23 extends through the access hole 4 and into the power duct 2. The bottom edge is rounded.

The attaching ring is adapted to be secured to the ducts by lock means 25 and 26 as explained below.

Referring to the telephone compartment 16 and in particular to FIG. 1-A, the circular wall 21 has an open section 24 disposed below the top of the duct 1. The bottom wall 10 of the telephone compartment 16 has a tab 30 adjacent to the open section 24 and extending into the aperture 20. A screw 31 is rotatable mounted on the tab 30 and carries a clamp 32. The bottom end of the screw 31 is staked over so the clamp cannot be threaded off.

The screw 31 can move the clamp 32 between the unlocked position noted by the dotted lines 32 wherein it extends into the aperture 20 and engages the circular wall 21 to the locked position shown by the full lines wherein the clamp is underneath the top of the duct 2 and abuts the right hand side 24a of the opening 24. The movement between the locked and unlocked positions is accomodated by the opening 24.

In the locked position, if the screw is turned further clockwise, the clamp 32 will ride up the screw 31 and engage the underside of the duct 2 and, thus, will cause the bottom 10 to bear down on the top of the duct and lock the attaching ring 6 in position.

In the power compartment 17, the lock 26 has the same construction as just described. Preferably, the lock arrangement 26 is disposed in the aperture 22 so as to be diametrically opposite to the position of the lock 25 in aperture 20.

The adjustable carpet plate 33 of the fitting, which holds the receptacles and which can be vertically adjusted after the pour, will next be described.

The plate 33 is generally rectangular in shape to conform to the shape of the attaching ring 6. A lower wall 34 of the plate 33 is adapted to fit down adjacent the side walls 11 of the attaching ring 6. A flange 35 at the top of the plate 33 extends radially outwardly over the floor covering (such as carpet) 36.

A pair of outlet openings 40 and 41 are formed in the plate 33. The outlet openings are surrounded by the shoulders 42 and 43. A telephone receptacle 44 is disposed in the opening 40 and is supported on the shoulder 42. A power receptacle 45 is disposed in the opening 41 and is supported on the shoulder 43. The receptacles are respectively in vertical alignment with the telephone aperture 20 and the power aperture 22.

A telephone access plate 46 is mounted on the plate 33 by being nested on the shoulder 42. A power access plate 47 is likewise nested on the shoulder 43. As will be observed, the flange 35, the plates 46 and 47, and the spacer section 50 are all substantially flat and generally flush with the surface of the floor covering 36.

With reference to FIG. 2 it will be seen that a barrier plate 51 extends down from the spacer section 50 into the channel 15. The barrier is coextensive with the spacer section and serves to electrically isolate the compartments 16 and 17.

The receptacles 44 and 45 and the access plates 46 and 47 are held on the plate 33 by conventional screws.

The means for mounting the plate 33 on the attaching ring 6 and for leveling the plate to attain the flush condition mentioned above will next be described.

The bottom wall 10 of the telephone compartment 16 has a pair of key-hole slots 52 and 53. The adjusting screws 54 and 55 are disposed respectively in the narrow part of each slot and extend upwardly. The adjusting screws 54 and 55 each have a very thin head which is disposed between the top of the duct and the bottom wall 10 as noted by the head 54a of screw 54 in FIG. 2. The narrow part of each slot is beveled to accommodate its head.

The power compartment 17 has a similar slot/screw arrangement as noted in FIG. 1 for the slot 56 and adjusting screw 57. The other adjusting screw for the power compartment 17 is noted at 58 in FIG. 2 and its head by 58a.

The plate 33 is provided with four downwardly extending adjusting cavity sections, two of which are noted at 60 and 61 in FIG. 2. The lower ends of the adjusting cavity sections 60 and 61 are threaded and respectively receive the screws 54 and 58. By inserting a screw driver down into the cavity (with the access plates removed) and into a slot on the end of the screw the same can be turned. This will cause a raising or lowering of the plate 33.

With the above described components in mind, we will now comment on other features of the fitting particularly as to how the same is adapted for thicker floors and as to the set-up during the pour of the concrete to avoid damage to the adjusting ring and connected parts.

Figure 3:
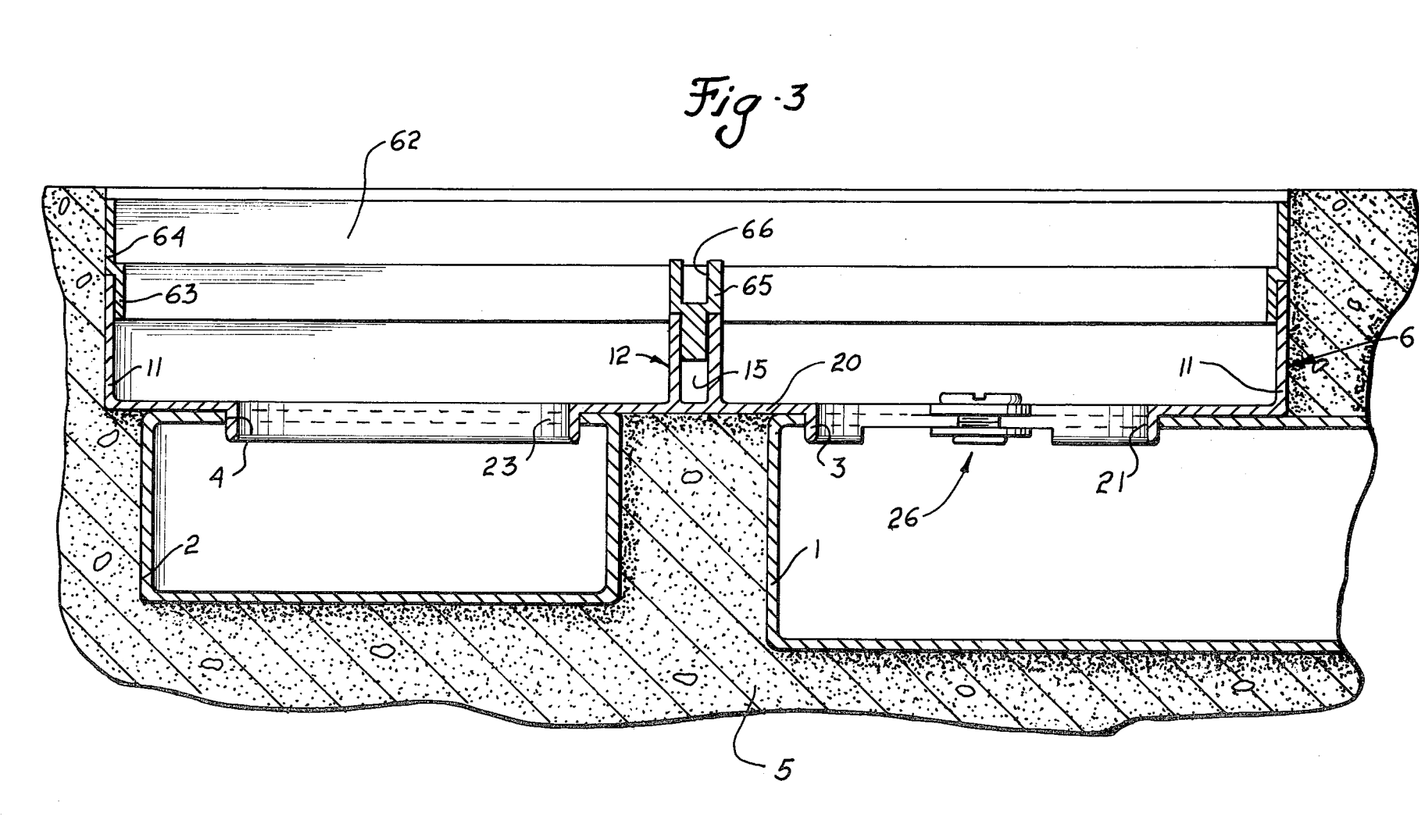
FIG. 3 is a sectional elevational view illustrating how the fitting is adaptable for use in thick concrete floors.

With reference to FIG. 3 the ducts 1 and 2 are embedded in the concrete 5 and the ducts carry the attaching ring 6 in the manner described above. The attaching ring 6 carries a generally rectangular shaped extention ring 62 which is supported on the top edges of the side walls 11. The ring 62 has a stabilizing skirt 63 which extends down in close association with the side walls 11 and also has an extention skirt 64 which extends vertically upwardly and is generally co-planar respectively with the side walls 11. For compartment isolating purposes, an extention ring divider 65 is supported on the intermediate wall 12 and has a channel 66 which is adapted to receive the barrier 51 of the adjusting ring when the same is mounted on the attaching ring. The extention ring 62 is readily adaptable for concrete floors of varying thickness by conforming the vertical height of the extention skirt 64 and the vertical height of the channel 66.

Figure 4:
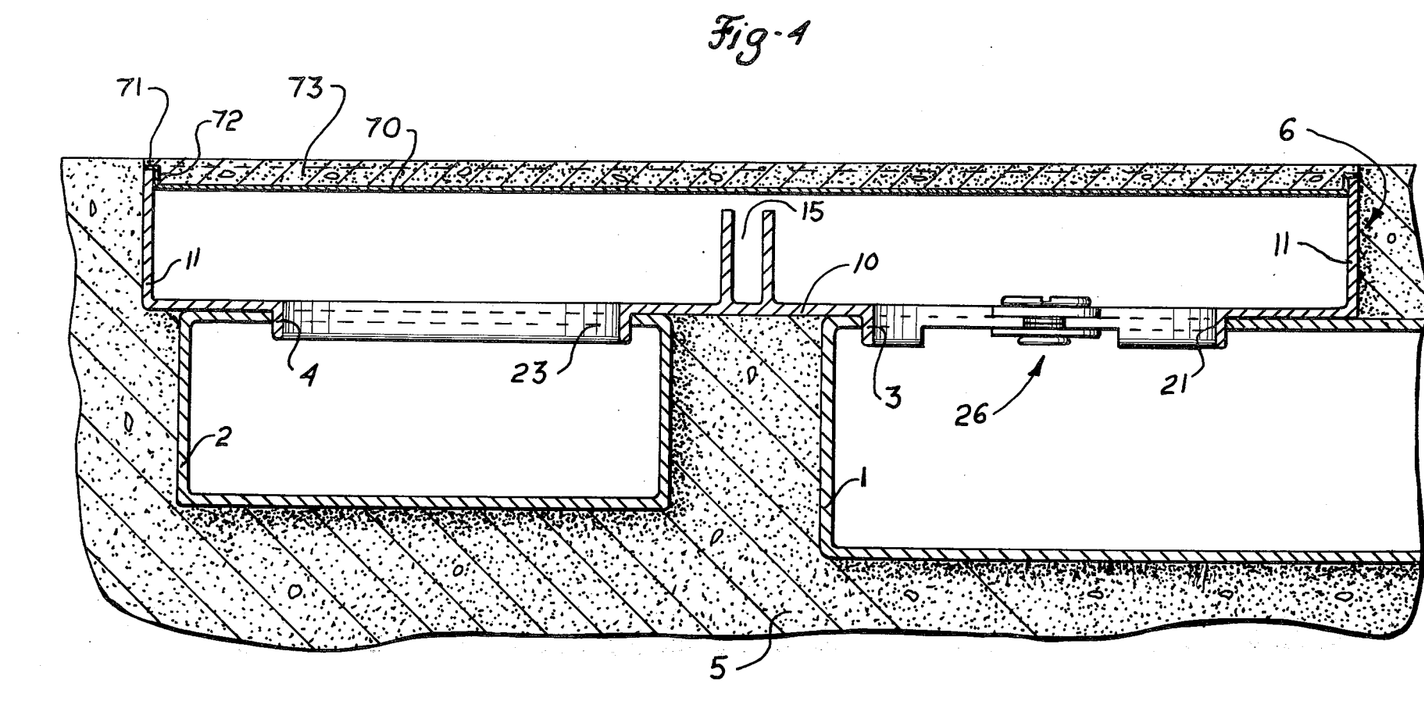
FIG. 4 is a sectional elevational view illustrating how the fitting is arranged during the pour and also when the floor location is inactive.

In FIG. 4 we have illustrated the arrangement of the components during the time of the pour which is also the arrangement when the floor section is to be in an inactivated status.

At the time the floor is being readied for the pour, the ducts 1 and 2, of course, are supported on conventional duct support means which spaces the bottom of each duct the desired distance above the concrete form. The attaching ring 6 is secured to the ducts in a manner as previously described above. Then a dished pan or what is commonly called a mud cap 70 is mounted on the attaching ring 6. The mud plate has a flange 71 which extends over the top edge of the side wall 11 of the ring and a skirt 72 which extends down to make a press fit with the side walls 11.

During the pour, the area surrounding the ducts 2 and surrounding the attaching ring 6 is filled with concrete and then concrete is trowelled into the mud plate as noted at 73 and this will eventually form part of the floor surface when the concrete is hardened.

If the floor area is to remain inactive, the parts remain in the condition as shown and may be covered with the usual floor covering.

As noted in FIG. 2, the adjusting cavities 60 and 61 are in their lowermost position, i.e. in engagement with the heads 54a and 58a. This is the condition for a floor of minimum thickness. As the thickness of the floor increases the adjusting ring will occupy a higher position on the adjusting screw. For still thicker floors, the arrangement described with FIG. 3 is employed.

When the floor area is to be activated the floor covering over the fitting is removed and the portions of the concrete 73 around the periphery of the mud cap are chipped away so the mud cap and concrete 73 can be removed. This, of course, provides access to the inside of the attaching ring 6 and permits the plate 33, etc. to be installed. The manner in which this is done will next be described.

The head of each adjusting screw is inserted into the wide part of its key-hole slot and shifted into the narrow part (accommodated by the beveled walls of the slot) until contact with the end of the narrow part. The foregoing will position the adjusting screws so that the plate 33 can be set down on the screws with the top ends of the screws in alignment with the threaded holes in the adjusting cavities 60, etc. Then, by turning the screws, the plate 33 can be moved down until such time as the flange 35 engages the floor covering.

After the plate 33 is in place, the telephone and power connections can be made and the receptacles and access plates mounted.

The access plates can be set up for immediate service status where the power and/or telephone conductor from the room being served are connected to the fitting or for a not-in-use status wherein the fitting awaits connection of the room conductors at some future time. The manner in which the foregoing is accomplished will be described more in detail in connection with FIGS. 5 through 8.

Figures 5, 6, 6A, 6B, 7, 8:
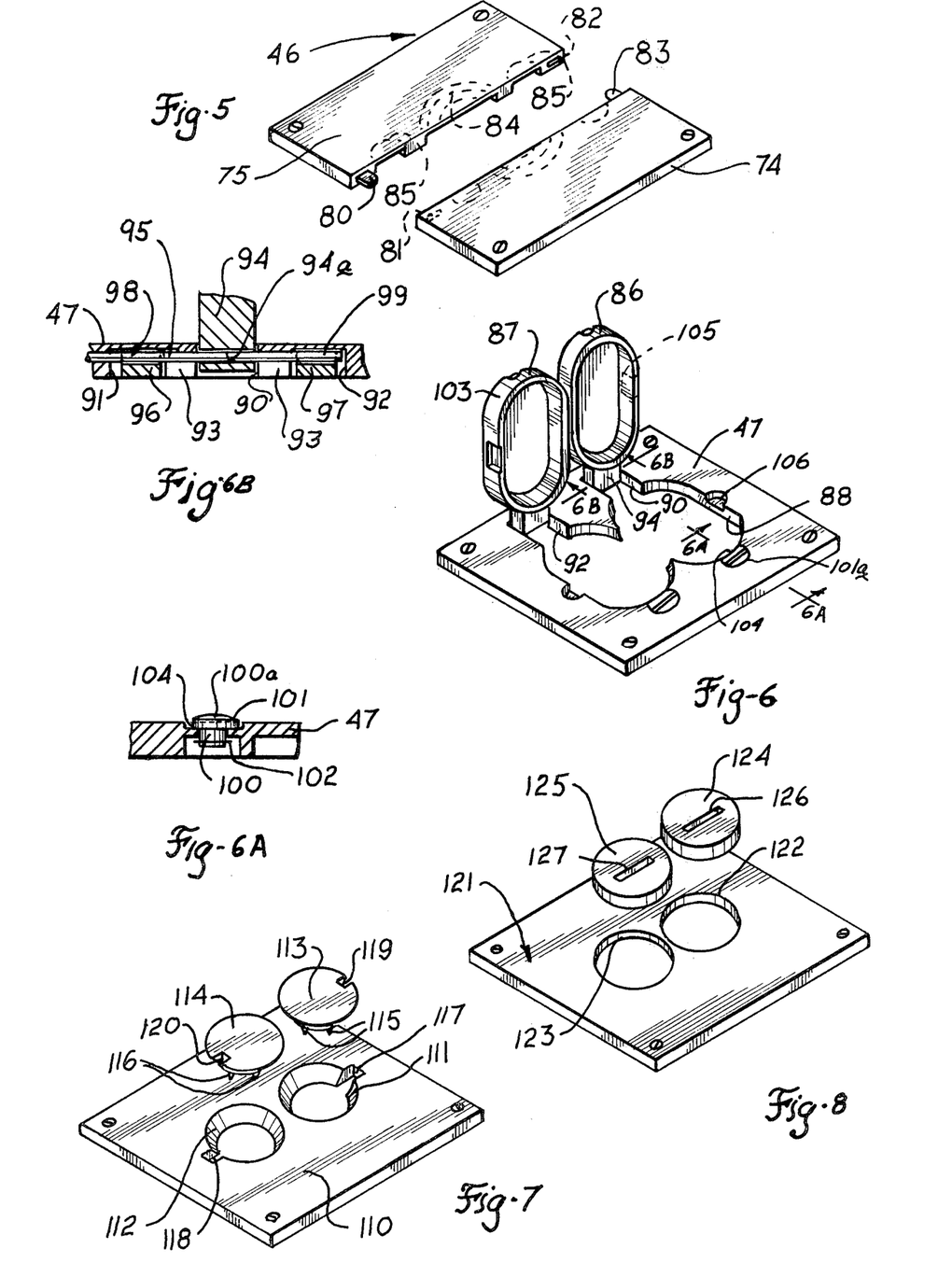

The telephone access plate 46 is detailed in FIG. 5. The plate comprises two parts 74 and 75 which, when installed, are adapted to abut one another as indicated in 76 in FIG. 1. At the abuting edge 76 the parts have tongue/groove locking means. On one side, the part 75 has a tongue 80 which is adapted to be received by the groove 81 in the part 74 and on the other side, the part 75 has a groove 82 (rather than a tongue) which is adapted to receive the tongue 83 on the part 74.

As noted, the parts 74 and 75 are formed with a large knockout 84 and two smaller knockouts 85 on either side. The two smaller knockouts 85 are adapted to receive up to 25-pair conductors while the knockout 84 is adapted to receive up to 100-pair conductors. Depending on the desired service, the knockouts are removed and the telephone conductors can be passed from the receptacle 44 out to the telephone in the room. However, the knockouts may remain intact.

Referring to FIG. 1, it will be noted that the parts 74 and 75, with the knockouts intact, provide a continuous top surface for the plate 46. Thus, when the area is to have an out-of-use status with respect to telephone service, the access plate is simply arranged without the knockouts being removed. The access plate 46 will protect the receptacle 44, etc.

After installation of telephone service to the room, if it is subsequently desired to inactivate the area, the conductors coming into the fitting from the room are removed and a new plate 46 (with the knockouts intact) is put into position. This provides for the protective surface. Likewise, when the area is to be abandoned with respect to telephone service, the same technique is used and the parts of the fitting underneath the access plate remain protected.

With respect to the power access plates, the invention contemplates both flip-cap and non-flip-cap type arrangements as will be commented on following.

A flip-cap arrangement is shown in FIG. 1 and in FIGS. 6 and 6-A. In FIG. 1 the flip-caps 86 and 87 are shown in the out-of-use or inactive position. In FIG. 6 the flip-caps are shown by the full lines in the active position. The caps 86 and 87 are identical in construction and the description of same will be confined to cap 86.

For receiving the cap 86, the power access plate has a cavity 88. The cap 86 is adapted to be pivoted as between the out-of-use and the active positions by the pivot means described following.

Referring to FIG. 6-B, the plate 47 has three cavities there being a center cavity 90 and cube-like outboard cavities 91 and 92. These cavities 91 and 92 are interconnected to cavity 90 by passageways 93. The cavity 90 contains the extention 94 of the cap 86. A pivot pin 95 extends through an opening 94a in the extention 94 and into the cavities 91 and 92 where it is held by the blocks 96 and 97 which have slots 98 and 99 receiving the pin 95.

For installing the cap 86, the pin 95 is placed in the aperture 94a in the extention 93 and then placed in the position shown. The slotted blocks 96 and 97 are placed in the cavities 91 and 92 to encompass the pin 95 and then are sonic-welded into place.

In the inactive or out-of-use position, the flip-cap 86 is adapted to be locked down by a locking screw arrangement noted following particularly in connection with FIGS. 6 and 6-A.

The screw 100 is mounted in a recess 101 (FIG. 6-A) and locked in position by the split ring 102 which allows the screw to be freely turned. For the out-of-use condition shown in FIG. 1, the head 100a of the screw is adapted to extend outwardly into the cavity 88 and thus into a notch 104 in the cap 86 to hold the same in the cavity.

The cap is unlocked as follows. When the screw is turned 180° from the position of FIG. 1, the notched section 104 frees the cap 86 from the head 100a and the cap can be pivoted upwardly. For pivoting purposes the plate 47 and cap 86 are respectively provided with the notches 105 (FIG. 1) and 106 (FIG. 6) which form an opening to receive the end of a screw driver of like tool which can be used to move the cap.

The flip-cap arrangement of FIG. 1 may be replaced by insert arrangements as illustrated in FIGS. 7 and 8, FIG. 7 illustrating a plug-type insert and FIG. 8 illustrating a threaded-type insert.

In FIG. 7, the power access plate 110 has a pair of apertures 111 and 112 the sides of which are tapered inwardly. These apertures are adapted to receive the inserts 113 and 114 whose side edges are tapered to conform to the aperture taper. The inserts 113 and 114 have prongs 115 and 116 which are adapted to mate with receptacles underneath the plate when the inserts are in position in the respective apertures.

For removal purposes, the plate has notches 117 and 118 and the inserts have corresponding notches 119 and 120. When the inserts are disposed in the aperture these notches form openings which permit the entry of the end of a screw driver or other tool so as to pry up the inserts.

It will be apparent that when the inserts are in the apertures, the access plate is provided with a continuous top surface which acts to protect the components below when service to the floor is to be discontinued.

In FIG. 8 the power access plate 121 has a pair of apertures 122 and 123 whose sides are threaded. These apertures are adapted to receive the threaded plugs 124 and 125 which are slotted at 126 and 127 to provide for the use of a screw driver. When the plugs 124 and 125 are in position in the apertures, the access plate 121 is provided with a continuous top surface to protect the components below during the time service to the particular floor area is discontinued.

We claim:

1. In a floor having an electrical distribution system underneath the surface of the floor, the system including substantially flat mechanism formed with a pair of adjacent access holes respectively providing access to the electrical distribution system, a floor service fitting comprising:

an attaching ring including a bottom wall engaging and supported on said flat mechanism, side walls disposed on the periphery of the bottom wall and extending upwardly therefrom and an intermediate wall extending between a pair of opposite side walls, the side walls and the intermediate wall forming a pair of compartments;

in each said compartment, an aperture formed by a circular wall on the bottom wall of the compartment and extending downwardly therefrom and through an access hole in said mechanism and the circular wall having an open section disposed below the top of said mechanism;

in each said compartment, a tab formed on the bottom wall of the compartment in a position adjacent to the open section of the circular wall, the tab extending into the aperture;

a pair of screws respectively rotatably mounted on said tabs;

a pair of locking clamps respectively threaded on said screws and respectively extending through the open sections of said circular walls and engaging the underside of said mechanism and locking the attaching ring to the mechanism;

in each compartment, a pair of key-hole slots formed in the bottom wall of the compartment;

in each key-hole slot, an adjusting screw having a threaded body extending upwardly away from the slot respectively into said compartments and having a thin head disposed between the top of said mechanism and said bottom wall;

an adjustable plate disposed over said attaching ring and having a substantially flat, peripheral flange for extending over floor covering used on said floor;

first and second outlet openings formed in said adjustable plate respectively in communication with said compartments;

first and second shoulders formed in said adjustable plate respectively surrounding said first and second outlet openings;

a first pair of adjusting cavity sections formed on said first shoulder and extending downwardly therefrom into one of said compartments, the lower ends of the cavity section being threaded and respectively receiving a pair of said adjusting screws;

a second pair of adjusting cavity sections formed on said second shoulder and extending downwardly therefrom into the other of said compartments, the lower ends of the second cavity sections being threaded and respectively receiving the other pair of said adjusting screws;

said adjusting cavities each providing an opening for a tool to be inserted therein to engage the adjusting screw in the cavity and turn the adjusting screw, the turning of the adjusting screws raising or lowering said adjusting plate for positioning said flange with respect to the surface of the floor;

at least one receptacle means mounted on one of said shoulders and extending through the outlet opening thereof; and a pair of substantially flat access plates respectively mounted on said first and second shoulders and covering the shoulders and extending over the first and second outlet openings and over said one receptacle means.

2. The fitting of claim 1 wherein at least one of said one access plates and has an opening providing passage for an electrical conductor.

3. The fitting of claim 1 wherein one of said receptacle means is a power receptacle, the access plate over said power receptacle has an aperture to provide for a power conductor to pass therethru;

and further including:

a cap pivotally mounted on last said access plate and moveable between a not-in-use position where it is disposed in said aperture to close off same and an active position where it is spaced away from said aperture to permit passage of a power conductor; and a locking screw rotatably mounted on last said plate adjacent to said aperture, the head of the screw extending over said cap when the cap is in the not-in-use position to lock the same and the head having a notch section and the screw being rotatable to position the notch section with respect to the cap so that the head is disengaged from the cap whereby the cap is unlocked and can be pivoted upwardly to the active position.

4. The fitting of claim 1 wherein:

one of said receptacle means is a power receptacle;

the access plate over said power receptacle has an aperture to provide passage for a power conductor; and further including:

a not-in-use insert in said aperture and having prong means extending into the receptacle for holding the insert in position; and notch means formed in last said access plate and in said not-in-use insert, the slot means being aligned with one another and providing an opening for the insertion of a tool to pry the insert out of the aperture.

5. The fitting of claim 1 wherein:

one of said receptacle means is a dual power receptacle;

the access plate over said dual power receptacle has a pair of threaded apertures each to provide for passage of a power conductor; and a pair of threaded not-in-use inserts respectively in said threaded apertures.

6. The fitting of claim 1 wherein:

one of said receptacle means is a telephone receptacle;

the access plate over said telephone receptacle is comprosed of two abutting parts with tongue and groove means respectively on the abutting edges of said parts; and slot means respectively adjacent the abutting edge of said parts, the slot means facing one another to form an opening to provide passage for a telephone conductor.

7. The fitting of claim 1 wherein there are two receptacle means, the second receptacle means being mounted on the other of said shoulders and extending through the other outlet opening thereof.

* * * * *